United States Patent
Park et al.

(10) Patent No.: US 8,059,716 B2
(45) Date of Patent: Nov. 15, 2011

(54) APPARATUS FOR AND METHOD OF TRANSCODING DATA

(75) Inventors: Chan-Yul Park, Gwangju Metropolitan (KR); Nam-Ik Cho, Seoul (KR)

(73) Assignees: Samsung Electronics Co., Ltd., Gyeonggi-do (KR); Seoul National University Industry Foundation, Gwanak-gu (KR)

( * ) Notice: Subject to any disclaimer, the term of this patent is extended or adjusted under 35 U.S.C. 154(b) by 1465 days.

(21) Appl. No.: 11/518,357

(22) Filed: Sep. 11, 2006

(65) Prior Publication Data
US 2007/0058720 A1   Mar. 15, 2007

(30) Foreign Application Priority Data
Sep. 10, 2005   (KR) .................. 10-2005-0084420

(51) Int. Cl.
*H04N 7/12* (2006.01)
(52) U.S. Cl. .................. 375/240.12; 375/240.03
(58) Field of Classification Search ............ 375/240.03, 375/240.2, 240.24, 240.25
See application file for complete search history.

(56) References Cited

U.S. PATENT DOCUMENTS

| | | | |
|---|---|---|---|
| 6,072,834 A | 6/2000 | Kim et al. | |
| 2003/0227974 A1* | 12/2003 | Nakamura et al. | 375/240.25 |
| 2006/0109900 A1* | 5/2006 | Shen | 375/240.03 |

FOREIGN PATENT DOCUMENTS

| | | |
|---|---|---|
| KR | 100249229 | 12/1999 |
| KR | 10-2004-0110755 | 12/2004 |
| KR | 10/2004-0110755 | 12/2004 |
| KR | 10-2005-0024731 | 3/2005 |

* cited by examiner

*Primary Examiner* — David Czekaj
*Assistant Examiner* — Anner Holder
(74) *Attorney, Agent, or Firm* — Harness, Dickey & Pierce, P.L.C.

(57) ABSTRACT

An apparatus for and a method of transcoding data in a first format, for example, MPEG (moving picture experts group)-2 data into data in a second format, for example, H.264 data. The apparatus may include a scaling dequantization unit, a coefficient transform unit, and/or a scaling quantization unit. The scaling dequantization unit may dequantize the data in the first format (e.g., MPEG-2 data) to generate a DCT (discrete cosine transform) coefficient. The coefficient transform unit may approximate a 4x4 second data format (e.g., H.264) integer transform matrix to a 4x4 DCT matrix and transforms the DCT coefficient into an integer transform coefficient using the approximated 4x4 DCT matrix. The scaling quantization unit may quantize the integer transform coefficient to generate the data in the second format (e.g., H.264 data).

7 Claims, 3 Drawing Sheets

APPARATUS FOR AND METHOD OF TRANSCODING DATA

PRIORITY STATEMENT

This application claims the benefit of Korean Patent Application No. 10-2005-0084420, filed on Sep. 10, 2005, in the Korean Intellectual Property Office, the disclosure of which is incorporated herein in its entirety by reference.

BACKGROUND

1. Field

Example embodiments relate to transcoding video data, for example, to an apparatus for and a method of transcoding moving picture experts group (MPEG)-2 data into H.264 data through a combination of inverse discrete cosine transform (IDCT) in MPEG-2 encoding and integer transform in H.264 encoding by approximating an integer transform matrix in H.264 encoding to a discrete cosine transform (DCT) matrix in MPEG-2 encoding.

2. Description of the Related Art

There are various video data encoding methods. For example, video data may be encoded into a moving picture experts group (MPEG)-2 format in high-definition (HD) televisions and digital versatile disks (DVDs) and may be encoded into an H.264 format in HD-DVD and BL-DVD. A user may be view a video by decoding encoded video data (e.g., encoding data) using a receiving device (or a reproducing device) suitable for the format of the encoded video data.

However, when the format of the encoded video data is not supported by the user's receiving device, the user cannot decode the encoded video data. For example, when the user's receiving device supports an H.264 format and the encoded data is in the MPEG-2 format, the user's receiving device cannot directly decode the encoded video data in the MPEG-2 format (e.g., MPEG-2 data). As a result, the MPEG-2 data should be transcoded into the encoded video data in the H.264 format (e.g., H.264 data).

The encoding of video data may be performed by transforming the video data using discrete cosine transform (DCT), quantizing the transformed video data, and encoding the quantized video data using entropy encoding. The decoding of encoded video data may be performed through an inverse process to encoding. Thus, the decoding may be performed by decoding the encoded video data using entropy decoding, dequantizing the decoded video data, and inversely transforming the dequantized video data.

A simple method of transforming MEPG-2 data into H.264 data based on such encoding and decoding of video data may be a pixel region transforming method in which MPEG-2 data may be transformed into pixels and the pixels may be encoded into H.264 data.

FIG. 1 is a block diagram of a conventional transcoder 100.

The transcoder 100 may use a pixel region transforming method. In other words, a dequantization unit 110 may generate a DCT coefficient by dequantizing MPEG-2 data. An inverse discrete cosine transform (IDCT) unit 130 may generate a video signal by performing IDCT on the DCT coefficients, thereby transforming the MPEG-2 data into pixels.

An integer transform unit 150 may generate an integer transform coefficient by performing integer transform on video data that may be transformed into the pixels. A quantization unit 170 may generate H.264 data by quantizing the integer transform coefficient.

However, the pixel region transforming method may be inefficient in terms of time and/or cost because encoding and decoding in two formats is performed.

MPEG-2 data may also be transformed into H.264 data using a method of mutually combining corresponding processes between decoding in the MPEG-2 format and encoding in the H.264 format, for example, a transform region transforming method.

During encoding in the MPEG-2 format, dequantized data may undergo IDCT. During encoding in the H.264 format, video data may undergo integer transformation. In the transform region transforming method, a DCT coefficient transformed by IDCT may be transformed into an integer transform coefficient.

In general, a DCT coefficient in the MPEG-2 format may have an 8×8 matrix form and a DCT coefficient in the H.264 format may have a 4×4 matrix form. A 4×4 integer transform coefficient matrix may be obtained by approximating the 4×4 DCT coefficient matrix for integer calculation. The 4×4 integer transform coefficient matrix may have some symmetric elements, but its element arrangement may be different from that of a DCT matrix. Thus, a simple transform of the 8×8 DCT coefficient matrix into an integer transform coefficient matrix may not reduce the amount of computation.

An 8×8 DCT coefficient may be transformed into an integer transform coefficient using two or more methods. One may combine an 8×8 DCT coefficient matrix with four integer transform coefficient matrices and multiply every element of the resulting matrix by 128, thereby transforming the 8×8 DCT coefficient matrix into an integer form. This method may be characterized by processing real-number calculations into integer calculations, but may require a large amount of computation.

Another may divide the 8×8 DCT coefficient matrix into a multiplication form of several simple matrices, as in a fast DCT algorithm. This method may be characterized by approximating elements of a matrix including multiplication as the exponents of 2 that may be processed by a shift operation. However, a larger error may occur and/or the number of required addition and shift operations may increase.

SUMMARY

Example embodiments provide an apparatus for transcoding data in a first format into data in a second format.

Example embodiments provide an apparatus for transcoding moving picture experts group (MPEG)-2 data into H.264 data.

Example embodiments provide an apparatus for transcoding moving picture experts group (MPEG)-2 data into H.264 data through a combination of inverse discrete cosine transform (IDCT) in MPEG-2 encoding and integer transform in H.264 encoding by approximating an integer transform matrix in H.264 encoding to a discrete cosine transform (DCT) matrix in MPEG-2 encoding.

Example embodiments also provide a method of transcoding data in a first format into data in a second format.

Example embodiments also provide a method of transcoding moving picture experts group (MPEG)-2 data into H.264 data.

Example embodiments also provide a method of transcoding MPEG-2 data into H.264 data through a combination of IDCT in MPEG-2 encoding and integer transform in H.264 encoding by approximating an integer transform matrix in H.264 encoding to a DCT matrix in MPEG-2 encoding.

According to example embodiments, there is provided an apparatus for transcoding data in a first format into data in a second format. The apparatus may include a scaling dequantization unit dequantizing the data in the first format to generate a transform coefficient in the first format, a coefficient transform unit approximating a transform matrix in the second format such that the transform matrix in the second format has the characteristic of the transform matrix in the first format to generate a changed transform matrix and transforming the transform coefficient in the first format into the transform matrix in the second format, and a scaling quantization unit the transform coefficient in the second format to generate the data in the second format.

According to example embodiments, there is provided an apparatus for transcoding MPEG (moving picture experts group)-2 data into H.264 data. The apparatus may include a scaling dequantization unit, a coefficient transform unit, and/or a scaling quantization unit. The scaling dequantization unit may dequantize the MPEG-2 data to generate a DCT (discrete cosine transform) coefficient. The coefficient transform unit may approximate a 4×4 H.264 integer transform matrix as a 4×4 DCT matrix and transform the DCT coefficient into an integer transform coefficient using the approximated 4×4 DCT matrix. The scaling quantization unit may quantize the integer transform coefficient to generate the H.264 data.

When transcoding the MPEG-2 data into the H.264 data without a resolution change, the coefficient transform unit may change an 8×8 DCT matrix into multiplication of a first diagonal matrix and a plurality of matrices, change the 4×4 integer transform matrix into multiplication of a second diagonal matrix and a 4×4 DCT matrix, and change a combination matrix in which multiplication of some of the plurality of matrices and the 4×4 DCT matrix may be combined into multiplication of a third diagonal matrix and a coefficient transform matrix having a symmetric structure. The scaling dequantization unit may be configured to perform primary scaling on the DCT coefficient using the first diagonal matrix, the coefficient transform unit may be configured to two-dimensionally transform the primarily scaled data using the coefficient transform matrix and multiplication of the remaining matrices except for some of the plurality of matrices, and the scaling quantization unit may be configured to perform secondary scaling on the two-dimensionally transformed data using the second diagonal matrix and the third diagonal matrix to generate the integer transform coefficient.

The coefficient transform unit may generate the combination matrix through multiplication of some of the plurality of matrices and four 4×4 DCT matrices and changes the combination matrix into a product of the third diagonal matrix and the coefficient transform matrix such that the value of one pair among symmetric element pairs of the coefficient transform matrix may be 1.

When transcoding the MPEG-2 data into the H.264 data with a ½ reduction of resolution, the coefficient transform unit may change the 4×4 integer transform matrix into a product of a second diagonal matrix and a 4×4 DCT matrix and generates a 4×4 DCT coefficient matrix corresponding to low frequency components from the DCT coefficient, and the scaling quantization unit may perform scaling on the 4×4 DCT coefficient matrix using the second diagonal matrix to generate the integer transform coefficient.

According to example embodiments, there is provided a method of transcoding data in a first format into data in a second format. The method may include dequantizing the data in the first format to generate a transform coefficient in the first format, changing a transform matrix in the second format such that the transform matrix in the second format has the characteristic of the transform matrix in the first format to generate a changed transform matrix and transforming the transform coefficient in the first format into the transform matrix in the second format, and quantizing the transform coefficient in the second format to generate the data in the second format.

According to example embodiments, there is provided a method of transcoding MPEG-2 data into H.264 data. The method may include dequantizing the MPEG-2 data to generate a DCT coefficient, approximating a 4×4 H.264 integer transform matrix to a 4×4 DCT matrix and transforming the DCT coefficient into an integer transform coefficient using the approximated 4×4 DCT matrix, and quantizing the integer transform coefficient to generate the H.264 data.

When transcoding the MPEG-2 data into the H.264 data without a change in resolution, the transforming of the DCT coefficient may change an 8×8 DCT matrix into a product of a first diagonal matrix and a plurality of matrices and change the 4×4 integer transform matrix into multiplication of a second diagonal matrix and a 4×4 DCT matrix, change a combination matrix in which multiplication of some of the plurality of matrices and the 4×4 DCT matrix may be combined into a product of a third diagonal matrix and a coefficient transform matrix having a symmetric structure, perform primary scaling on the DCT coefficient using the first diagonal matrix, two-dimensionally transform the primarily scaled data using the coefficient transform matrix and multiplication of the remaining matrices except for some of the plurality of matrices, and perform secondary scaling on the two-dimensionally transformed data using the second diagonal matrix and the third diagonal matrix to generate the integer transform coefficient.

The transforming of the combination matrix may include generating the combination matrix through multiplication of some of the plurality of matrices and four 4×4 DCT matrices and changing the combination matrix into multiplication of the third diagonal matrix and the coefficient transform matrix such that one of symmetric element pairs of the coefficient transform matrix may be 1.

When transcoding the MPEG-2 data into the H.264 data with a ½ reduction of resolution, transforming the DCT coefficient may include changing the 4×4 integer transform matrix into a product of a second diagonal matrix and a 4×4 DCT matrix, generating a 4×4 DCT coefficient matrix corresponding to low frequency components from the DCT coefficient, and performing scaling on the 4×4 DCT coefficient matrix using the second diagonal matrix to generate the integer transform coefficient.

BRIEF DESCRIPTION OF THE DRAWINGS

The above and other features and advantages of example embodiments will become more apparent by describing in detail thereof with reference to the attached drawings in which.

DETAILED DESCRIPTION OF EXAMPLE EMBODIMENTS

Figure 1:
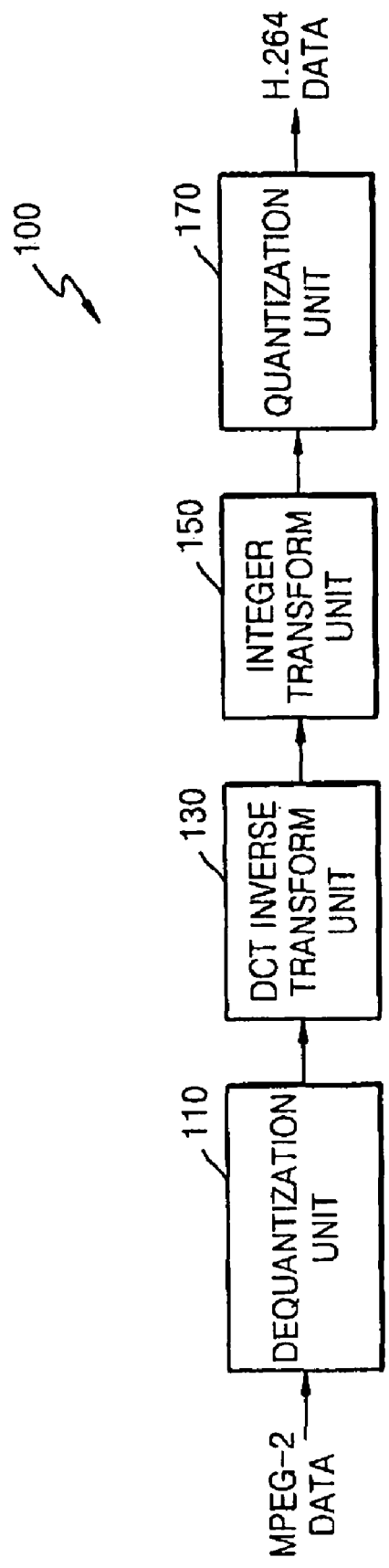
FIG. 1 is a block diagram of a conventional transcoder.

Hereinafter, example embodiments will be described in detail with reference to the accompanying drawings. In the drawings, the same or similar elements may be denoted by the same reference numerals even though they may be depicted in different drawings.

Example embodiments are described more fully hereinafter with reference to the accompanying drawings. Example embodiments may, however, be embodied in many different forms and should not be construed as limited to the embodiments set forth herein. Rather, example embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the appended claims.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
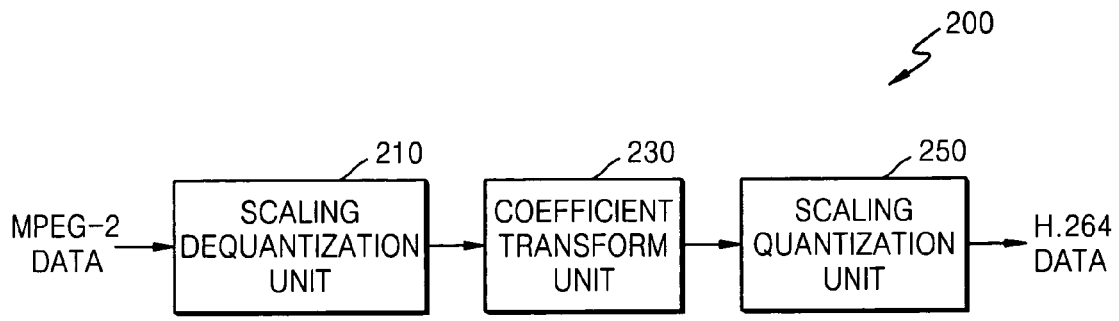
FIG. 2 is a block diagram of a transcoder according to example embodiments.
Figure 3:
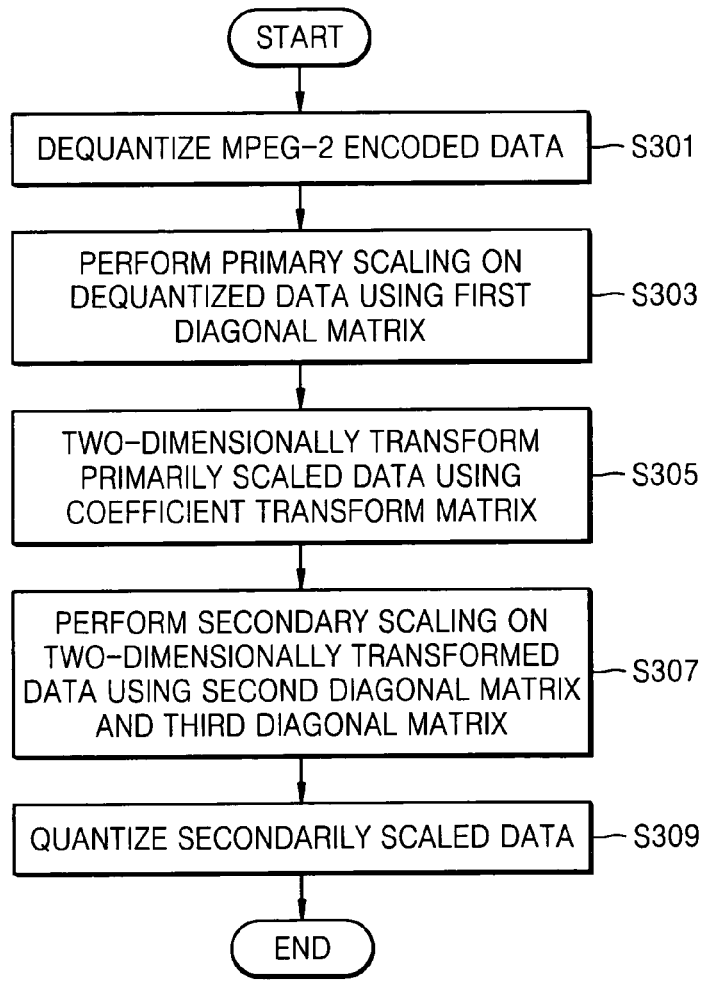
FIG. 3 is a flowchart illustrating a transcoding method according to example embodiments.

FIG. 2 is a block diagram of a transcoder 200 according to example embodiments and FIG. 3 is a flowchart illustrating a transcoding method according to example embodiments. Hereinafter, the configuration and operation of the transcoder 200 will be described with reference to FIGS. 2 and 3.

The transcoder 200 may include a scaling dequantization unit 210, a coefficient transform unit 230, and/or a scaling quantization unit 250.

The scaling dequantization unit 210 may dequantize data in a first format, e.g., MPEG-2 data in operation S301 and perform scaling on the dequantized data using a first diagonal matrix in operation S303. The first diagonal matrix may be obtained from an 8×8 DCT matrix of MPEG-2 data. In other words, the first diagonal matrix may be obtained by changing a DCT matrix into a product of a plurality of matrices and the first diagonal matrix. In example embodiments, the first diagonal matrix may be obtained using an algorithm proposed by Y. Arai, T. Agui, and M. Nakajima in "A Fast DCT-SQ scheme for images", Trans. IEICE, vol. E-71, no. 11, pp. 1095-1097, Nov. 1988 (also known as "the AAN algorithm"), the entire content of which are hereby incorporated by reference.

The coefficient transform unit 230 may two-dimensionally transform the output of the scaling dequantization unit 210 using a coefficient transform matrix in operation S305. The coefficient transform matrix may be obtained using multiplication of the plurality of matrices induced from the DCT matrix and a 4×4 integer transform matrix of H.264.

In example embodiments, the 4×4 integer transform matrix may be approximated to a 4×4 DCT matrix by changing the 4×4 integer transform matrix into a product of a second diagonal matrix and a 4×4 DCT matrix. The coefficient transform matrix may be obtained using multiplication of some of the plurality of matrices obtained from the DCT transform matrix and the 4×4 DCT matrix. A process of obtaining the coefficient transform matrix will be described in detail later.

The scaling quantization unit 250 may perform scaling on the two-dimensionally transformed data using the second diagonal matrix and a third diagonal matrix induced together with the coefficient transform matrix in operation S307 and generates H.264 data by quantizing the scaled data in operation S309.

As stated above, in example embodiments, the amount of computation required for transcoding MPEG-2 data into H.264 data may be reduced using the coefficient transform matrix obtained by changing and combining the 8×8 DCT matrix and the 4×4 integer transform matrix.

Figure 4:
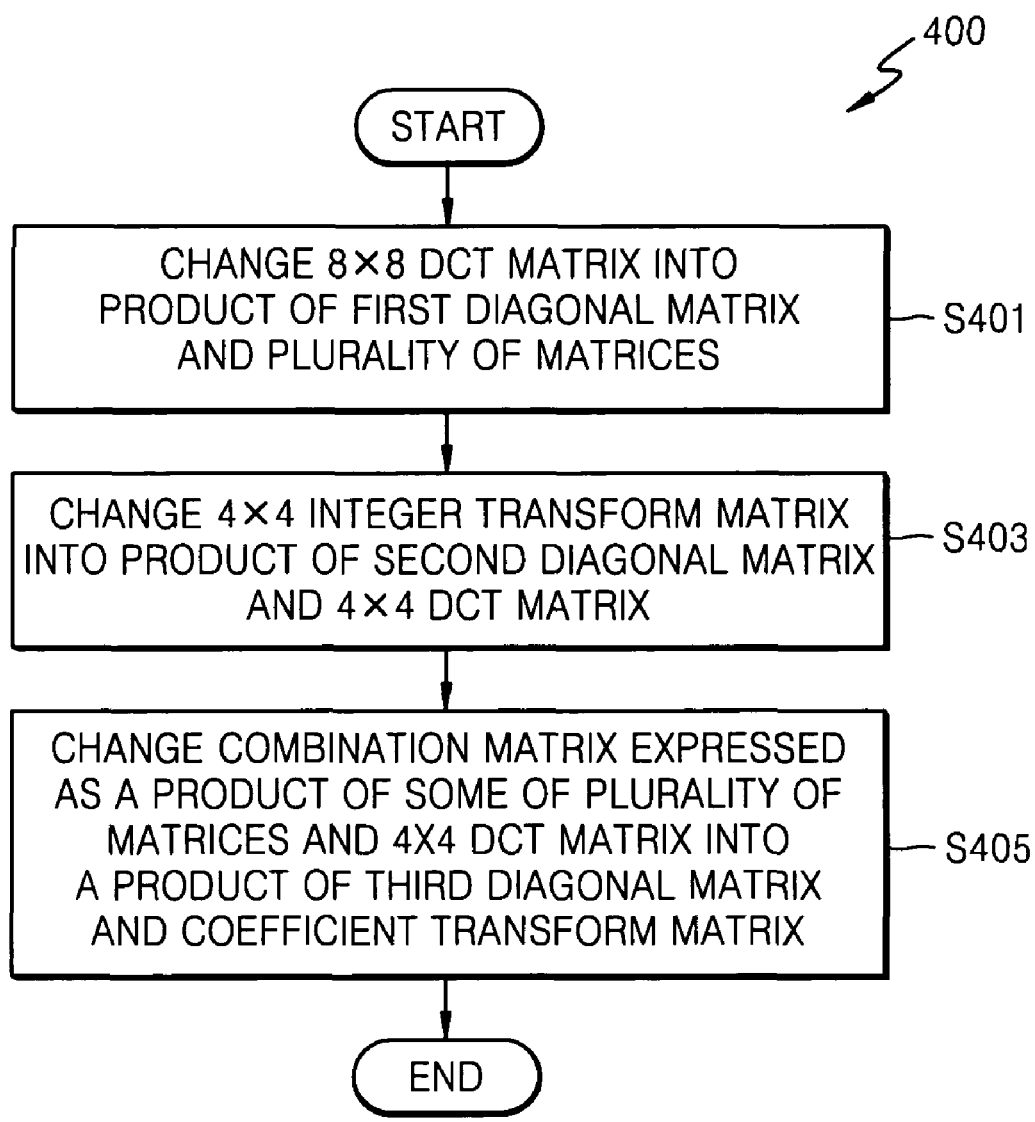
FIG. 4 is a flowchart illustrating a process of obtaining matrices used in example embodiments.

FIG. 4 is a flowchart illustrating a process of obtaining matrices used in example embodiments.

In the following description, generalized quantization or dequantization and two-dimensional transform will be considered to search for a portion whose computation amount may be reduced in transcoding and a determinant capable of reducing the amount of computation in that portion will be obtained.

Dequantization of 8×8 input data X[8][8] during dequantization of MPEG-2 may be expressed as follows:

$$Y[i][j]=X[i][j] \times DQT_{MPEG-2}[qp][i][j] >> SI_{MPEG-2}[qp][i][j] \text{ for } i,j=0,\ldots,7 \quad (1),$$

where Y[i][j] indicates dequantized data of input data x[i][j] at (i, j), $DQT_{MPEG-2}$ indicates a dequantization table of MPEG-2, and $SI_{MPEG-2}$ indicates a shift index of MPEG-2 and may be determined by a given quantization coefficient qp.

Quantization of H.264 may be similar to dequantization of MPEG-2 and quantization of 4×4 input data X[4][4] may be expressed as follows:

$$Y[i][j]=X[i][j] \times QT_{H.264}[qp][i][j] >> SI_{H.264}[qP][i][j] \text{ for } i,j=0,\ldots,3 \quad (2),$$

where $QT_{H.264}$ indicates a quantization table of H.264, and $SI_{H.264}$ indicates a shift index of H.264 and may be determined by the given quantization coefficient qp.

A process of multiplying input data by the value of a quantization table during quantization or dequantization may be generalized into a determinant as follows:

$$Y = X \otimes S \quad (3)$$

$$= \begin{bmatrix} x_{0,0} & \cdots & x_{0,N-1} \\ \vdots & \ddots & \vdots \\ x_{N-1,0} & \cdots & x_{N-1,N-1} \end{bmatrix} \otimes \begin{bmatrix} s_{0,0} & \cdots & s_{0,N-1} \\ \vdots & \ddots & \vdots \\ s_{N-1,0} & \cdots & s_{N-1,N-1} \end{bmatrix}$$

$$= \begin{bmatrix} y_{0,0} & \cdots & y_{0,N-1} \\ \vdots & \ddots & \vdots \\ y_{N-1,0} & \cdots & y_{N-1,N-1} \end{bmatrix},$$

where X indicates input data to be quantized or dequantized, Y indicates quantized or dequantized output data of the input data X, and S indicates an augmented matrix used for quantization. An operator symbol $\otimes$ indicates multiplication of elements in the same positions in the same-size matrices and thus, $y_{i,j}=x_{i,j} \times s_{i,j}$ in Equation 3.

A transform matrix T may be generally expressed as a product of matrices including a diagonal matrix D as follows:

$$T = D \otimes Q \quad (4)$$

$$= \begin{bmatrix} d_0 & 0 & \cdots & 0 \\ 0 & 0 & \cdots & 0 \\ \vdots & 0 & \ddots & \vdots \\ 0 & 0 & \cdots & d_{N-1} \end{bmatrix} \otimes \begin{bmatrix} q_{0,0} & q_{0,1} & \cdots & q_{0,N-1} \\ q_{1,0} & q_{1,1} & \cdots & q_{1,N-1} \\ \vdots & \vdots & \ddots & \vdots \\ q_{N-1,0} & q_{N-1,1} & \cdots & q_{N-1,N-1} \end{bmatrix}$$

$$= \begin{bmatrix} t_{0,0} & t_{0,1} & \cdots & t_{0,N-1} \\ t_{1,0} & t_{1,1} & \cdots & t_{1,N-1} \\ \vdots & \vdots & \ddots & \vdots \\ t_{N-1,0} & t_{N-1,1} & \cdots & t_{N-1,N-1} \end{bmatrix}$$

When the input data X is two-dimensionally transformed using the transform matrix T, two-dimensionally transformed data Z may be expressed as follows:

$$Z=T \times T^t = DQ \times Q^t D = K \otimes (Q \times Q^t) \quad (5)$$

In other words, two diagonal matrices (D, $D^t$) may be changed to a new augmented matrix K. X indicates an N×N input matrix, T indicates an N×N transform matrix, Z indicates an N×N output matrix, and K indicates an N×N augmented matrix where elements have a relationship of $k_{i,j}=d_{i,i} \times d_{j,j}$.

Thus, a process of quantizing and two-dimensionally transforming the input data X may be expressed as follows:

$$Y=S \otimes Z=(S \otimes K) \otimes (Q \times Q^t) \quad (6)$$

Because values of elements of the augmented matrix S in quantization may be predetermined or desired and values of elements of the augmented matrix K that is multiplication of the two diagonal matrices (D, $D^t$) induced from the transform matrix T may be also predetermined or desired, values of elements of a matrix $(S \otimes Z)$ may be also predetermined or desired.

Thus, a change in the amount of computation in quantization and two-dimensional transform only depends on $T \times T^t$, e.g., $Q \times Q^t$, and thus, the amount of computation may be reduced by reducing the amount of computation of $Q \times Q^t$. When an augmented matrix is changed, values of elements of the augmented matrix may be maintained as integer values using shift operations of Equations 1 and 2. Thus, a change in the amount of computation with a change in an augmented matrix may be negligible. For example, 0.125xa may be expressed as a>>3.

When elements of an augmented matrix are multiplied by real numbers, an error that may occur in a process of expressing values of the elements of the augmented matrix as integer values may be negligible. In example embodiments, calculations limited to 16 bits may be expanded to 32-bit calculation, but such calculation may be not an issue in terms of actually generalized calculation of 32 bits or more.

Hereinafter, a description will be made regarding a process of obtaining matrices used in example embodiments to reduce the amount of computation when MPEG-2 data may be transcoded into H.264 data without a change in resolution.

Transformation of an 8×8 DCT coefficient into four H.264 integer transform coefficients may be expressed as follows:

$$Y = \begin{pmatrix} H & O_4 \\ O_4 & H \end{pmatrix} T^t \times T \begin{pmatrix} H & O_4 \\ O_4 & H \end{pmatrix}^t, \quad (7)$$

where H indicates a 4×4 integer transform matrix of H.264, T indicates an 8×8 DCT matrix, X indicates an 8×8 DCT coefficient, and Y indicates four 4×4 H.264 integer transform coefficients.

In matrix multiplication, the position of a diagonal matrix does not affect the multiplication result. Thus, if the 8×8 DCT matrix T may be changed into a form having a diagonal matrix, the diagonal matrix may be expressed as a product of matrices and may be included in quantization or dequantization, thereby reducing the amount of computation in coefficient transform.

In example embodiments, the 8×8 DCT matrix may be changed into a product of a plurality of matrices including a diagonal matrix $D_8$ using an AAN algorithm as follows. The diagonal matrix $D_8$ may be the first diagonal matrix and may be used in the scaling dequantization unit 210.

$$T=D_8 PB_1 B_2 MA_1 A_2 A_3 \quad (8)$$

The amount of computation of Equation 7 is two times higher than that of a matrix expressed as follows:

$$\begin{pmatrix} E_0 \\ E_1 \end{pmatrix} = \begin{pmatrix} H & O_4 \\ O_4 & H \end{pmatrix} T^t, \quad (9)$$

where $E_0$ and $E_1$ are 4×8 matrices in which elements corresponding to each other have the same absolute values and the opposite signs to each other. Thus, by performing computation after removing redundant elements, the amount of computation may be reduced. Thus, for reduction of the amount of computation, $E_0+E_1$ and $E_0-E_1$, which are respectively defined by $E_+$ and $E_-$, are used instead of $E_0$ and $E_1$. $E_+$ and $E_-$ may be expressed as follows:

$$E_+ = (H+H)A_3{}^t A_2{}^t A_1{}^t M^t B_2{}^t B_1{}^t P^t D_8 \quad (10\text{-}1)$$

$$E_- = (H-H)A_3{}^t A_2{}^t A_1{}^t M^t B_2{}^t B_1{}^t P^t D_8 \quad (10\text{-}2)$$

Because the integer transform matrix H has a partial symmetric structure and its structure may be largely different from a DCT matrix, a fast method used in DCT may not be used. If an integer transform matrix may be changed into a multiplication form of a diagonal matrix and a DCT matrix, the fast method used in DCT may be used, thereby reducing the amount of computation.

The integer transform matrix may be induced by approximating the DCT matrix. Thus, in example embodiments, the integer transform matrix may be approximated to the DCT matrix by using an inverse process to the process of obtaining the integer transform matrix by approximating the DCT matrix.

In other words, in example embodiments, the 4×4 integer transform matrix H may be transformed such that it may be approximated to a product of a 4×4 diagonal matrix $D_4$ and a 4×4 DCT matrix. Thus, the fast method used in DCT may be used.

In example embodiments, the integer transform matrix H may be changed as follows:

$$H = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (11)$$

$$\approx \begin{bmatrix} d_1 & 0 & 0 & 0 \\ 0 & d_2 & 0 & 0 \\ 0 & 0 & d_3 & 0 \\ 0 & 0 & 0 & d_4 \end{bmatrix} \begin{bmatrix} a & a & a & a \\ b & c & -c & -b \\ a & -a & -a & a \\ c & -b & b & -c \end{bmatrix}$$

$$= D_4 T_4,$$

where $$a = \frac{1}{2}, \; b = \sqrt{\frac{1}{2}} \cos\left(\frac{\pi}{8}\right), \; c = \sqrt{\frac{1}{2}} \cos\left(\frac{3\pi}{8}\right), \; \text{and} \; d = \frac{c}{b}$$

and values $d_i$ of diagonal elements of the diagonal matrix $D_4$ (i=0, 1, 2, 3) may be values of diagonal elements of $HT_4{}^t$. In example embodiments, the diagonal matrix $D_4$ may be the second diagonal matrix and may be used in the scaling quantization unit 250. In other words, the second diagonal matrix may be expressed as a product of matrices and may be included in quantization, thereby reducing the amount of computation in coefficient transform.

As stated above, in example embodiments, the first diagonal matrix $D_8$ may be included in dequantization and may be used in the scaling dequantization unit 210 and the second diagonal matrix $D_4$ may be included in quantization and may be used in the scaling quantization unit 250.

Thus, the amount of computation may be reduced by defining and calculating combination matrices ($E_+{}^d$, $E_-{}^d$) including a matrix M having real numbers as elements instead of the matrices E+ and E−. The combination matrices ($E_+{}^d$, $E_-{}^d$) may be expressed as follows:

$$E_+{}^d = (T_4 + T_4) A_3{}^t A_2{}^t A_1{}^t M^t \quad (12\text{-}1)$$

$$E_-{}^d = (T_4 - T_4) A_3{}^t A_2{}^t A_1{}^t M^t \quad (12\text{-}2)$$

Values of elements of a 4×4 DCT matrix $T_4$ and values of elements of multiplication $MA_1 A_2 A_3$ of a plurality of matrices induced from an 8×8 DCT matrix $T_8(??)$ may be predetermined or desired, and thus values of elements of the combination matrices ($E_+{}^d$, $E_-{}^d$) may be expressed as follows:

$$E_+^d = \begin{bmatrix} 4 & 0 & 0 & 0 & 0 & 0 & 0 & 0 \\ 0 & 0 & 0 & 0 & -2.4143 & 0 & 1 & 1.3066 \\ 0 & 4 & 0 & 0 & 0 & 0 & 0 & 0 \\ 0 & 0 & 0 & 0 & 1 & 0 & -0.4142 & 0.5412 \end{bmatrix} \quad (13\text{-}1)$$

$$E_-^d = \begin{bmatrix} 0 & 0 & 0 & 0 & 1.0824 & 1.4142 & 2.6132 & 1 \\ 0 & 0 & 2.6131 & 2.6131 & 0 & 0 & 0 & 0 \\ 0 & 0 & 0 & 0 & 0 & -1.4142 & 0 & 1 \\ 0 & 0 & -1.0824 & 1.0824 & 0 & 0 & 0 & 0 \end{bmatrix} \quad (13\text{-}2)$$

Because the combination matrices ($E_+{}^d$, $E_-{}^d$) may be obtained from a DCT matrix and the DCT matrix has a symmetric structure, the combination matrices ($E_+{}^d$, $E_-{}^d$) may be changed to have many redundant elements, thereby reducing the amount of computation.

In example embodiments, by dividing elements in the second and fourth rows of the combination matrices ($E_+{}^d$, $E_-{}^d$) by 1.3066 and 0.5412, respectively, the combination matrices ($E_+{}^d$, $E_-{}^d$) may be changed to have many redundant elements as follows:

$$E_+^d = \begin{bmatrix} 1 & 0 & 0 & 0 \\ 0 & 0.7654 & 0 & 0 \\ 0 & 0 & 1 & 0 \\ 0 & 0 & 0 & 1.8478 \end{bmatrix} \quad (14\text{-}1)$$

$$\begin{bmatrix} 4 & 0 & 0 & 0 & 0 & 0 & 0 & 0 \\ 0 & 0 & 0 & 0 & -1.8478 & 0 & 0.7654 & 1 \\ 0 & 4 & 0 & 0 & 0 & 0 & 0 & 0 \\ 0 & 0 & 0 & 0 & 1.8478 & 0 & -0.7654 & 1 \end{bmatrix}$$

$$E_-^d = \begin{bmatrix} 1 & 0 & 0 & 0 \\ 0 & 0.7654 & 0 & 0 \\ 0 & 0 & 1 & 0 \\ 0 & 0 & 0 & 1.8478 \end{bmatrix} \quad (14\text{-}2)$$

$$\begin{bmatrix} 0 & 0 & 0 & 0 & 1.8478 & 1.4142 & 0 & 0 \\ 0 & 0 & 2 & 2 & 0 & 0 & 0 & 0 \\ 0 & 0 & 0 & 0 & 0 & -1.4142 & 0 & 1 \\ 0 & 0 & -2 & -2 & 0 & 0 & 0 & 0 \end{bmatrix}$$

As expressed in Equations (14-1) and (14-2), division in units of a row may be expressed as a diagonal matrix and a diagonal matrix of combination matrices (14-1) and (14-2) in example embodiments may be a third diagonal matrix and may be used in the scaling quantization unit 250. In other words, the third diagonal matrix may be expressed with multiplication of matrices and may be included in quantization, thereby reducing the amount of computation in coefficient transform.

In example embodiments, the other matrices of Equations (14-1) and (14-2) except for the diagonal matrix may be coefficient transform matrices and may be used in the coefficient transform unit 230. In other words, the coefficient transform unit 230 obtains matrices ($E_0$, $E_1$) using the coefficient transform matrices and multiplication $PB_1B_2$ of a plurality of matrices and two-dimensionally transforms scaled data output from the dequantization unit 210 using the matrices ($E_0$, $E_1$).

The amount of computation of Equations (14-1) and (14-2) when the diagonal matrix is excluded is smaller than that of Equations (13-1) and (13-2). Such a feature may be obtained by approximating an integer transform matrix to a 4×4 DCT matrix.

Hereinafter, a process of transcoding MPEG-2 data into H.264 data with a ½ reduction of resolution according to example embodiments will be described.

When the resolution is reduced to ½, a 4×4 integer transform coefficient matrix Y of H.264 may be given by:

$$Y=HT_4{}^tX_{00}T_4H^t \quad (15)$$

where $X_{00}$ indicates a 4×4 matrix of an 8×8 DCT coefficient matrix X, which corresponds to low frequencies and $T_4$ indicates a 4×4 DCT matrix.

As expressed in Equation 11, in example embodiments, the integer transform matrix H may be changed into a product of the diagonal matrix $D_4$ and the 4×4 DCT matrix $T_4$. Thus, Equation 15 may be arranged as follows:

$$Y=D_4X_{00}D_4{}^t \quad (16)$$

In example embodiments, the diagonal matrix $D_4$ may be the second diagonal matrix, and may be included in quantization and may be used in the scaling quantization unit 250.

Thus, when the resolution is reduced to ½ in example embodiments, the scaling dequantization unit 210 does not need to perform scaling on dequantized MPEG-2 data using the first diagonal matrix. In addition, the coefficient transform unit 230 may extract a 4×4 matrix corresponding to low frequencies from an 8×8 DCT coefficient matrix and transmit the 4×4 matrix to the scaling quantization unit 250 without additionally processing the output of the scaling dequantization unit 210, e.g., the 8×8 DCT coefficient matrix. The scaling quantization unit 250 may perform scaling on the 4×4 matrix corresponding to low frequencies only using the second diagonal matrix and quantizes the scaled data, thereby generating H.264 data.

While the process of transcoding MPEG-2 data into H.264 data may be described in example embodiments, other example embodiments may be used irrespective of the format of encoded data.

In other words, when data in a first format is transcoded into data in a second format, a transform matrix used for encoding in the second format may be approximated as that used for encoding in the first format, thereby combining an inverse transform process in the first format and a transform process in the second format.

Moreover, by using a transform matrix in the first format, a transform matrix in the second format, and a diagonal matrix separated during a process of combining the inverse transform process in the first format and the transform process in the second format in the form of multiplication of matrices in a dequantization process in the first format or a quantization process in the second format, the amount of computation required for transforming a transform coefficient in the first format into data in the second format may be reduced.

Although example embodiments refer to example transformations, example matrices, and example sizes, all of these parameters may be varied. For example any 4×4 or 8×8 matrix may be varied to any N×N matrix (where N is an integer).

As described above, according to example embodiments, the amount of computation may be reduced, thereby reducing time and/or cost required for transcoding.

While example embodiments have been particularly shown and described with reference to the figures thereof, it will be understood by those of ordinary skill in the art that various changes in form and details may be made therein without departing from the spirit and scope of example embodiments as defined by the following claims.

What is claimed is:

1. A method of transcoding MPEG (moving picture experts group)-2 data into H.264 data, the method comprising:
   dequantizing the MPEG-2 data to generate a DCT (discrete cosine transform) coefficient;
   approximating a 4×4 H.264 integer transform matrix as a 4×4 DCT matrix, and transforming the DCT coefficient into an integer transform coefficient using the 4×4 DCT matrix; and
   quantizing the integer transform coefficient to generate the H.264 data;
   wherein the transforming of the DCT coefficient includes,
   changing an 8×8 DCT matrix into a product of a first diagonal matrix and a plurality of matrices and changing the 4×4 H.264 integer transform matrix into a product of a second diagonal matrix and the 4×4 DCT matrix,
   changing a combination matrix expressed as a combination of some of the plurality of matrices and the 4×4 DCT matrix into a product of a third diagonal matrix and a coefficient transform matrix having a symmetric structure,
   performing primary scaling on the DCT coefficient using the first diagonal matrix,
   two-dimensionally transforming the primarily scaled data using a product of the coefficient transform matrix and remaining ones of the plurality of matrices except the some of the plurality of matrices, and
   performing secondary scaling on the two-dimensionally transformed data using the second diagonal matrix and the third diagonal matrix to generate the integer transform coefficient.

2. The method of claim 1, wherein changing the combination matrix comprises:
   generating the combination matrix through multiplication of the some of the plurality of matrices and four 4×4 DCT matrices; and
   changing the combination matrix into a product of the third diagonal matrix and the coefficient transform matrix such that the value of one pair among symmetric element pairs of the coefficient transform matrix is 1.

3. The method of claim 1, wherein when transcoding the MPEG-2 data into the H.264 data with a ½ reduction of resolution, the transforming of the DCT coefficient into the integer transform coefficient comprises:
   changing the 4×4 H.264 integer transform matrix into a product of the second diagonal matrix and the 4×4 DCT matrix;
   generating a 4×4 DCT coefficient matrix corresponding to low frequency components from the DCT coefficient; and performing scaling on the generated 4×4 DCT coefficient matrix using the second diagonal matrix to generate the integer transform coefficient.

4. An apparatus for transcoding MPEG (moving picture experts group)-2 data into H.264 data, the apparatus comprising:
a scaling dequantization unit configured to dequantize the MPEG-2 data to generate a DCT (discrete cosine transform) coefficient;
a coefficient transform unit configured to approximate a 4×4 H.264 integer transform matrix as a 4×4 DCT matrix, and transform the DCT coefficient into an integer transform coefficient using the 4×4 DCT matrix; and
a scaling quantization unit configured to quantize the integer transform coefficient to generate the H.264 data; wherein
when transcoding the MPEG-2 data into the H.264 data without a resolution change, the coefficient transform unit changes an 8×8 DCT matrix into a product of a first diagonal matrix and a plurality of matrices, changes the 4×4 H.264 integer transform matrix into a product of a second diagonal matrix and the 4×4 DCT matrix, and changes a combination matrix expressed as a combination of some of the plurality of matrices and the 4×4 DCT matrix into a product of a third diagonal matrix and a coefficient transform matrix having a symmetric structure.

5. The apparatus of claim 4, wherein the scaling dequantization unit is configured to perform primary scaling on the DCT coefficient using the first diagonal matrix, the coefficient transform unit is configured to two-dimensionally transform the primarily scaled data using a product of the coefficient transform matrix and remaining ones of the plurality of matrices except the some of the plurality of matrices, and the scaling quantization unit is configured to perform secondary scaling on the two-dimensionally transformed data using the second diagonal matrix and the third diagonal matrix to generate the integer transform coefficient.

6. The apparatus of claim 4, wherein the coefficient transform unit is configured to generate the combination matrix through multiplication of some of the plurality of matrices and four 4×4 DCT matrices, and configured to change the combination matrix into a product of the third diagonal matrix and the coefficient transform matrix such that the value of one pair among symmetric element pairs of the coefficient transform matrix is 1.

7. The apparatus of claim 4, wherein when transcoding the MPEG-2 data into the H.264 data with a ½ reduction of resolution, the coefficient transform unit changes the 4×4 H.264 integer transform matrix into a product of the second diagonal matrix and the 4×4 DCT matrix and generates a 4×4 DCT coefficient matrix corresponding to low frequency components from the DCT coefficient, and the scaling quantization unit performs scaling on the 4×4 DCT coefficient matrix using the second diagonal matrix to generate the integer transform coefficient.

* * * * *